United States Patent [19]

Salladay et al.

[11] Patent Number: 4,619,684
[45] Date of Patent: Oct. 28, 1986

[54] PRESSURE REACTOR FOR PRODUCING DIAMMONIUM PHOSPHATE

[75] Inventors: David G. Salladay, Decatur; Frank P. Achorn, Killen, both of Ala.

[73] Assignee: Tennessee Valley Authority, Muscle Shoals, Ala.

[21] Appl. No.: 843,414

[22] Filed: Mar. 24, 1986

Related U.S. Application Data

[63] Continuation of Ser. No. 538,714, Oct. 3, 1983, now Defensive Publication No. T104,201.

[51] Int. Cl.$^4$ .............................................. C05B 7/00
[52] U.S. Cl. .......................................... 71/34; 71/43; 71/64.06
[58] Field of Search ........................... 71/34, 43, 64.06

[56] References Cited

U.S. PATENT DOCUMENTS

T101,203  11/1981  Parker et al. ................... 71/34 X
3,730,700  5/1973   Groenveld ........................ 71/34

Primary Examiner—Ferris H. Lander
Attorney, Agent, or Firm—Robert A. Petrusek

[57] ABSTRACT

Process for producing diammonium phosphate (DAP) fertilizer from phosphoric and sulfuric acids, anhydrous ammonia, and water in a specially designed reactor operated at high pressures to granulate diammonium phosphate at low recycle ratios and with relatively small fossil fuel requirement drying per ton of product. Previously operated reactors employed pressures ranging from 0 to 10 psig pressures. This reactor operates at 40 to 80 psig. The process substantially increases production in existing DAP granulation plants and has helped reduce grade deficiencies. Also, use of this reactor for DAP production results in about the same levels of ammonia loss to the scrubber as the prior-art tank preneutralizer, higher operating factors, less maintenance and no transfer pump plugging. Operation is at a temperature of 300° or more °F., while the tank preneutralizer operates normally at 240° F.

7 Claims, 2 Drawing Figures

SHEET OF CONVENTIONAL PROCESS FOR PRODUCTION OF GRANULAR DIAMMONIUM PHOSPHATE

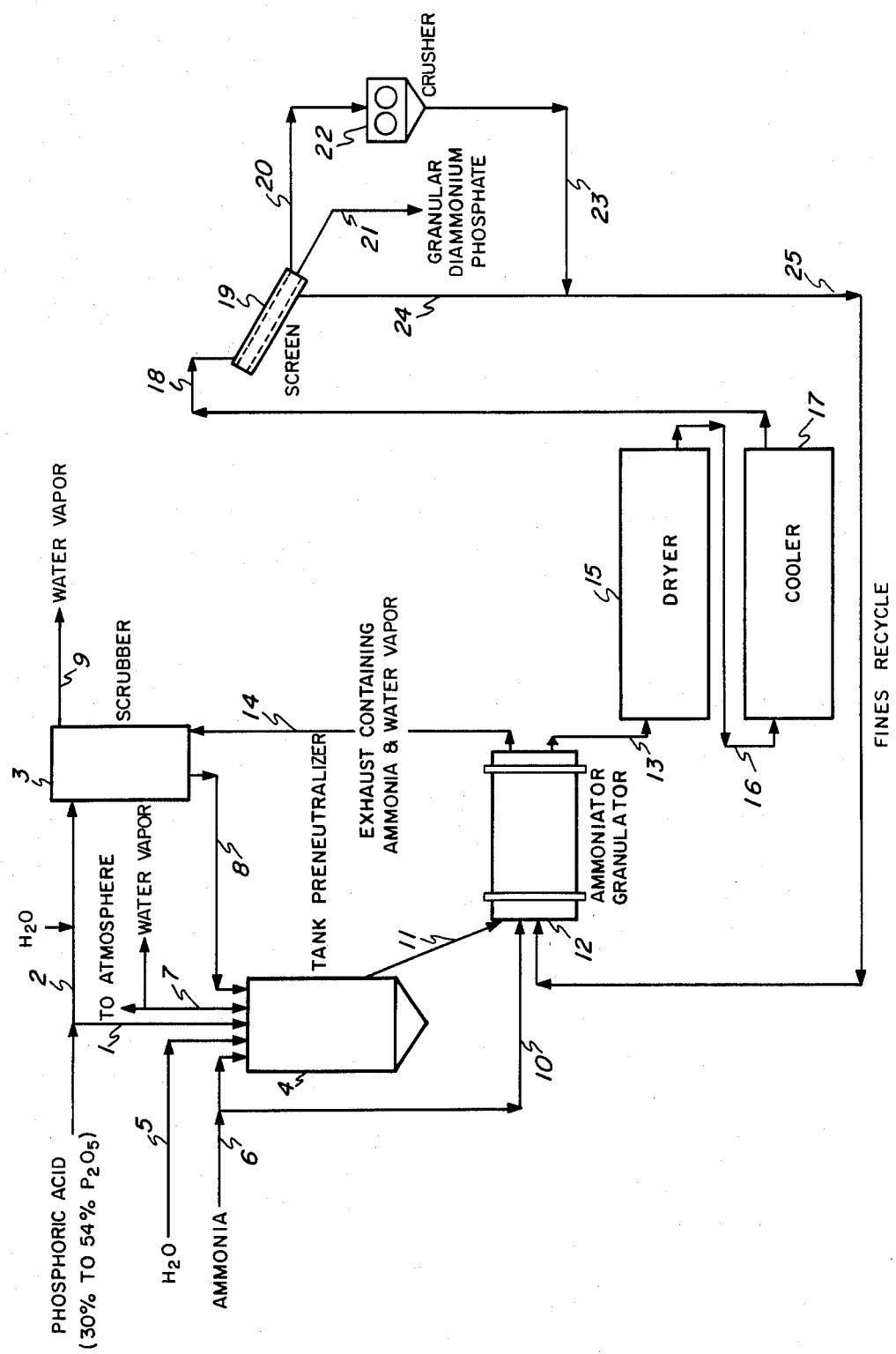

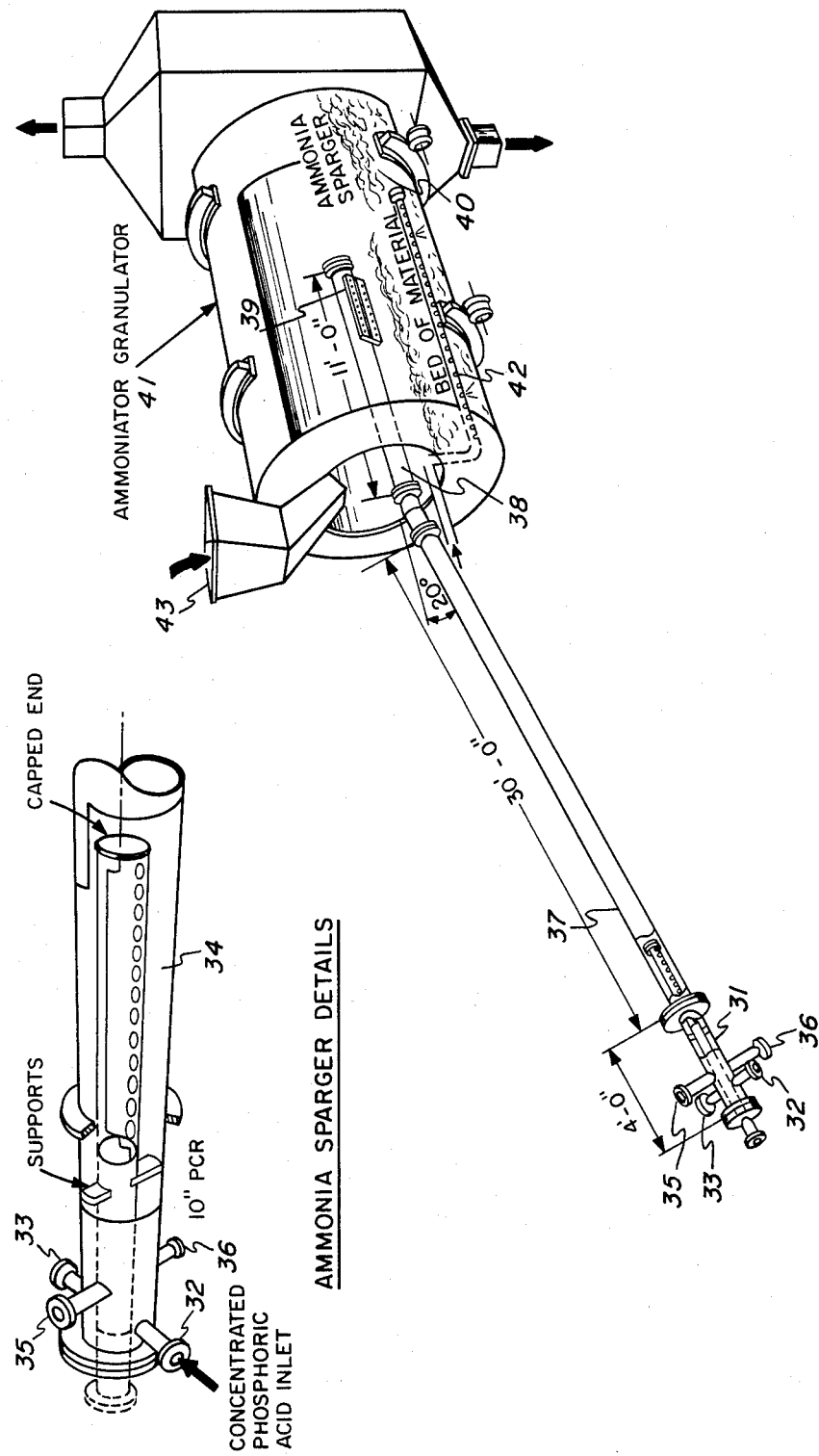

PRESSURE REACTOR FOR PRODUCING DIAMMONIUM PHOSPHATE

The invention herein described may be manufactured and used by or for the Government for governmental purposes without the payment to us of any royalty therefor.

This application is a continuation of application Ser. No. 538,714, filed Oct. 3, 1983, now Defensive Publication T104,201, published May 1, 1984, for PRESSURE REACTOR FOR PRODUCING DIAMMONIUM PHOSPHATE.

INTRODUCTION

The present invention relates to an improvement in the production of fertilizers from phosphoric acid, sulfuric acid, and ammonia, and more particularly, it relates to improved processes for the production of granular diammonium phosphate, i.e., 18-46-0.

Granular diammonium phosphate is the most widely produced phosphate fertilizer used in the world today. Each year over 10 million tons of diammonium phosphate is produced in the United States, while over 20 million tons of this fertilizer material is produced worldwide. Diammonium phosphate is used in dry bulk blends and in fluid fertilizers for applications to agronomic crops.

In recent years United States phosphate producers have been faced with little or no profitability in the production of granular diammonium phosphate. Production cost and in particular the high capital investment cost of diammonium phosphate granulation plants have combined with low diammonium phosphate fertilizer prices in the world market and lower production cost in foreign countries to result in an overall poor economic situation. The new technology discussed herein can easily be retrofitted into an existing DAP granulation plant at a minimum cost while obtaining very significant increases in production capacity. While new DAP plant production capacity currently costs about $400,000 per ton, this new DAP pressure reactor can provide incremental production capacity increases for $10,000 to $20,000 per ton.

For the purposes of this disclosure, the term diammonium pnosphate will be used even though there is sulfur as ammonium sulfate present. Currently commercially available diammonium sulfate (DAP) contains about 1.5 percent sulfur. In the instant process for DAP production discussed herein, varying quantities of sulfuric acid can be present in the phosphoric acid feeds to the pressure reactor.

PRIOR ART

In U.S. Pat. No. 3,153,574, Achorn et al, assigned to the assignee of the present invention, there is disclosed a process for the manufacture of diammonium phosphate from wet-process phosphoric acid and ammonia; however, in this process, a large preneutralizer is required. A principal advantage of the instant process is that the requirement for this large preneutralizer has been eliminated. This conventional tank preneutralizer process is currently used to produce almost all of the diammonium phosphate which is manufactured throughout the world. This conventional process utilizes the TVA ammoniator-granulator which is described in U.S. Pat. No. 2,729,554, Nielsson, also assigned to the assignee of the present invention. Nielsson teaches a process for ammoniating superphosphate and is not concerned with the production of DAP.

In U.S. Pat. No. 3,310,371, Lutz discusses a reaction apparatus in which premixed acids are brought together with ammonia. Practice of the present invention precludes premixing of the acids so as to avoid severe acid corrosion in the equipment. The Lutz apparatus includes a vapor disengager in the form of a cyclonic separator. The present invention utilizes high pressures created by a specifically designed slotted discharge to obtain very high separations of moisture from the melt. Lutz has to use higher moistures so that this intermediate material will be pumpable. A major advantage of the DAP pressure reactor employed in the practice of the instant invention is that it is installed in the rotary granulator that sprays directly onto the bed of falling granules.

In U.S. Pat. No. 3,730,700, Groenveld discusses the use of a pressure-type reactor to produce DAP. He teaches that DAP is made by ammoniating the phosphoric acid all the way to DAP in the pipe reactor. A plot of ammonia vapor pressure data over saturated aqueous solutions of ammonium orthophosphates (discussed in more detail infra), as calculated by Kruglov et al at an N:P mole ratio of 1.9 the vapor pressure of ammonia would be 660 millimeters of mercury. Discharging such a mixture of ammonium phosphate to the atmosphere would result in totally unmanageable ammonia losses into the scrubber loop. A major accomplishment of the instant technology is its commercial feasibility. An ammonia loss of only 19 percent is calculated. Groenveld also claims good results when operating with a venturi. Extensive commercial scale DAP production tests of the instant invention at a present rate of 58 tons per hour have shown a venturi to actually be the cause of plugging in the pressure-type reactor. Groenveld also claims that high velocity and low residence time within the reactor is beneficial. Practice of the instant invention reveals that lower velocity within the inclined reaction section of the pressure reactor at a consequently low ammonia loading are necessary to successfully produce DAP.

In U.S. Pat. No. 3,954,942, Achorn et al, assigned to the assignee of the present invention, refer to the production of granular diammonium phosphate in the pipe-cross reactor. In U.S. Pat. No. 4,134,750, Norton et al, also assigned to the assignee of the present invention, there is disclosed pilot plant operating data for the production of diammonium phosphate using the TVA pipe-cross reactor (see Norton et al, table 5). In generating this plant data, the pipe-cross reactor was operated at 265° F. and an undetermined pressure. The granulation plant was operated at a recycle ratio of 6.6 pounds of recycle per pound of product. The pipe-cross reactor was fed with 51 to 54 percent phosphoric acid. Although a pipe-cross reactor has been used for the production of diammonium phosphate, the operating results would not be of enonomic value to the commercial diammonium phosphate producers. Using the conventional tank preneutralizer process, Achorn's recycle ratios of 5:1 are obtained using approximately 40 percent $P_2O_5$ feed phosphoric acid. The instant process described herein utilizes a specially designed pressure reactor that operates at higher temperatures and pressures to obtain recycle ratios of almost 3 to 1 while using the same 40 percent $P_2O_5$ acid as used by the commercial producers, supra.

In U.S. Defensive Publication T101,203, Parker et al, assigned to the assignee of the present invention, there is discussed a process which has operating parameters somewhat similar to the instant process except it was tested in a commercial plant wherefrom high ammonia losses were observed which caused considerable difficulty in the scrubbing system. These high ammonia losses caused in imbalance in the plant such that large quantities of low strength acid had to be added to the scrubber. Losses as high as 45 percent of the total ammonia added to the reactor were observed. Therefore, as the instant process was evolved and developed, a much longer reactor than that used by Parker et al was finally employed. In the tests shown by Parker, the ammonia loadings (indirect measurement of retention time) were 2.5 to 3.0, whereas in the instant process, it was determined that longer retention times were required; consequently, specially designed ammonia inlet spargers to the reactor were prepared. Also, it was found that it was necessary to increase the pressure in the reactor into the range of 40 to 80 pounds so that the high partial pressure of ammonia above the saturated solution in the reactor could be avoided. Parker et al claim to operate their reactor at an $NH_3:H_3PO_4$ mole ratio of about 1.3 to 1.8 and the temperature of the slurry at about 200° F. to about 300° F. The partial pressure of ammonia above saturated solution in this reactor was calculated to be in the range of 2.75 millimeters to 1653 millimeters of mercury. They also report that this reactor was operated at about atmospheric pressure. Therefore, losses from their reactor would be extremely high. Since the production rate in Parker et al was only 0.35 to 0.40 tons per hour, such high percentages of ammonia losses were not apparently fully appreciated; whereas, when their process was tested in the early development of work leading up to the discovery of the instant invention at production rates of about 40 tons per hour, the losses were extreme and the plant could not be operated for periods longer than 30 minutes. In the present process, these distinct disadvantages have been overcome by increasing the pressure in the reactor, increasing the retention time in the reactor by using a longer type reactor, designing a special perforated pipe type sparger for the initial uniform addition of ammonia into the reactor and designing a slotted type discharge from the reactor such that the slurry from the reactor is injected into the bed of material in the granulator over a longer length of the bed, thus allowing for the uniform reaction of the slurry with material within the granulator. For ease in comparing the attributes of the instant invention over the practice of the prior art, particularly that taught by Parker et al, tabulated below is a summary of the operating conditions of the instant invention vs. Parker et al.

| Item | Instant Invention | Parker et al |
|---|---|---|
| Heat flux discharge Area, $10^6$ Btu/in$^2$-hr | 2.866 | 0.597 |
| Ammonia loading lb/in$^3$-hr | 0.463 | 0.319 |
| Pressure, psig | 40 | 0 |
| Temperature, °F. | 290 | 240 |
| Ammonia loss, % of total fed | 19 | 45 |
| Production rate, tons per hour | 58 | 40 |

The loss data shown in the above tabulation of Parker et al's invention was determined during an actual plant test. Even when Parker et al's low, near atmospheric pressure was used with a low ammonia loading, the ammonia losses were high. In the instant invention, the heat flux value (pounds of ammonia per square inch per hour) was substantially higher than in Parker et al. Also, the cross section and length of their reactor is substantially larger than the equivalent diameter and length of Parker et al's reactor; therefore, the total retention time in the instant reactor is greater than Parker et al's and because of this higher retention time, there is a longer contact of the ammonia with the incoming phosphoric acid and the reaction is allowed to proceed to completion prior to discharging of the slurry into the granulator. Also, the pressure within the reactor of the present invention was considerably higher than the atmospheric pressure at which Parker et al's reactor operated. With these conditions in the specially designed perforated pipe type ammonia sparker that is installed in the reactor it was possible to avoid high losses of ammonia from the reactor. Parker et al's reactor has a multiple hole type discharge and some plant tests show that these holes tend to plug during operation. Although the holes can be cleaned within a small plant it is difficult to clean them in a large plant. The instant process uses the slotted discharge and tests show that this type of discharge will not plug at the high production rates required in commercial plants. This type of design also allows for insertion of plates across the slot so that the pressure within the reactor can be varied. Perforated pipe discharge would be extremely difficult to adapt to a high pressure reactor.

BACKGROUND

The advantages of the pressure reactor for the production of DAP were discovered while working with a pipe-cross reactor (PCR) in a commercial granulation plant. This commercial plant uses the conventional type TVA process for the production of DAP. The reactor which is used is constructed of 316L stainless steel. The original reactor was 10 inches in diameter and 15 feet long. Currently a 6-inch diameter reaction tube with a 4-inch circular pipe discharge is being used.

The plant has a throughput capacity of about 500 tons per hour. In a production test, a rate of 98 tons per hour was maintained for several days. Results from this test are shown in Table I below.

TABLE I

| Production of DAP Using PCR and Preneutralizer | |
|---|---|
| Test No. | B6981 Ton/hr |
| Production rate | 98 |
| Formulation, product (lb/ton) | |
| To scrubbers | |
| Weak phosphoric acid (21.1% $P_2O_5$) | 925 |
| Strong phosphoric acid (44.2% $P_2O_5$) | 1566 |
| Calculated acid strength, % $P_2O_5$ | 37.5 |
| To preneutralizer | |
| Scrubber liquor (N:P mole ratio 0.80) | 1940 |
| Ammonia (gaseous) | 122 |
| To PCR | |
| Scrubber liquor (N:P mole ratio 0.80) | 574 |
| Ammonia (gaseous) | 38.8 |
| Calculated % total production for PCR | 23 |
| Production rate PCR | 22.5 |
| To granulator | 122 |
| Ammonia (gaseous) | |
| Operating results | |
| Preneutralizer | |
| N:P mole ratio | 1.60[a] |

TABLE I-continued

Production of DAP Using PCR and Preneutralizer

| Test No. | B6981 Ton/hr |
|---|---|
| Temperature slurry, °F. | 257 |
| Specific gravity slurry | 1.57 |
| PCR | |
| N:P mole ratio | 1.54[b] |
| Temperature melt, °F. | 320 |
| Pressure, (psig) | 51 |
| Specific gravity | 1.54 |
| Granulator | |
| N:P mole ratio | 1.92[c] |
| Material discharge temperature, °F. | 212 |
| Calculated results | |
| Recycle ratio (from screen analysis) tons recycle/ton product | 2.0 |
| Heat flux PCR (Btu/hr. in$^2$) | 135,000 |
| Ammoniating volume (lbs NH$_3$/hr/in$^3$) | 0.4 |

[a]Obtained by filtration during operation (average).
[b]Based on chemical analysis of sample.
[c]Chemical analysis of composite sample.

As may be seen in Table I, supra, weak phosphoric acid containing 27.1 percent $P_2O_5$ was fed to the scrubber along with some medium strength acid containing 44.2 percent $P_2O_5$. Average strength of the acid fed to the scrubber was about 38 percent $P_2O_5$. This scrubber slurry was fed both to the preneutralizer and to the PCR. Calculations show that about 23 percent of the total production was made by the PCR and the remainder was made through use of the preneutralizer. The proportions of phosphoric acid fed to the scrubber and to the preneutralizer resulted in an N:P mole ratio of 0.80:1 in the scrubber slurry. Ammonia was added to the preneutralizer and to the pressure reactor. The average recorded feed rates showed that the N:P mole ratio of the slurry from the preneutralizer and PCR should be about 1.54:1. Chemical analysis of grab samples of this slurry shows the mole ratios to be somewhat higher than the desired ratios. Temperature of the slurry from the preneutralizer was 257° F. and from the PCR 320° F. at a pressure of 51 psig. Because the reactor is operated under pressure, it is possible to increase heat content of the melt discharged from the reactor as compared to the slurry sprayed from the preneutralizer.

The plant operated well under these conditions and a nominal 18-46-0 DAP was produced which had good particle size distribution and excellent hardness. The recycle:product weight ratio in this test appeared to be substantially less than the 5:1 recycle ratio normally required in DAP plants. Moisture content of the product from the granulator was only 2.9 percent, which is significantly less than the 4 percent moisture normally obtained for this product when the TVA conventional DAP process is used. Unfortunately, there was low airflow through the granulator during this test. However, in spite of this adverse condition, this company has experienced an increased production rate from about 1,800 tons per day before the pressure reactor was installed to about 2,400 tons per day after its installation. It is believed that, although the pressure reactor operation does not account for all of the increased production rate, it is the major factor. Also, some savings in the amount of fossil fuel required to dry the product were observed. Estimates of these savings of fuel requirement run as high as about one dollar per ton even though the pipe was used in conjunction with the preneutralizer tank. Note: These savings are, of course, much greater when the pipe is used by itself in the practice of the instant invention, to wit, no fuel is required for drying.

SUMMARY OF INVENTION

Several new and advantageous features of the instant process over conventional prior-art processes are realized in the present invention. Among the advantageous features are:

A. The equipment required for the practice of this invention is simple, economical and very easy to operate.

B. The heat of chemical reaction is utilized to evaporate water from the phosphoric and sulfuric acids while introducing them to the bed of granular materials in the ammoniator-granulator. Efficient utilization of this chemical heat results in a recycle requirement that is significantly lower than in many other processes for the production of granular diammonium phosphate.

C. Other processes for the production of granular diammonium phosphate require fuel to dry the product from the ammoniator-granulator. In the present process, the resulting product is of a low enough moisture content such that it can be sufficiently dried during cooling so that a product with low enough moisture for satisfactory storage will result and no fuel is required for drying.

D. The velocity of gases and melt from the reactor is about 4 times greater than the atmospheric pressure reactors. This intimate contact helps to avoid high losses of ammonia from the granulator. This is advantageous because this high velocity causes intimate contact between the granules which must be ammoniated and the ammonia that exits the reactor.

E. This high pressure reactor technology results in a very large quantity of product size granules. Even when operating a commercial plant at almost 120 percent of conventional operating capacity, the cagemills for oversize reduction did not even have to be turned on continuously.

F. This process can use several methods to control scaling of the DAP pressure reactor. Either a small quantity of continuously fed sulfuric acid or intimate slug feeds of sulfuric acid can be used to control scaling. Also, an occasional hot aqua ammonia soak of the inclined pressure reactor will remove scale that has built up.

G. The use of the pressure reactor will result in very substantial capital investment savings since an existing DAP granulation plant can have its production rate increased by 30 to 50 percent.

OBJECTS OF THE INVENTION

Granular diammonium phosphate is currently produced using the tank preneutralizer process of Achorn et al '574, supra. This process requires a recycle ratio of 5 to 6 tons of recycle per 1 ton of product. Also, fossil fuel drying requirements are about 3 to 4×10$^5$ Btu's per ton of product. A recently commissioned commercial DAP plant to produce 120 tons per hour of granular DAP cost $52 million. In this recently constructed plant, each ton of DAP production capacity cost $433,000. A major objective of this new, successfully demonstrated pressure reactor technology is reduced construction and production costs for granular diammonium phosphate. For example, a pressure reactor facility can be retrofitted into an existing 50 ton/hour DAP plant for a total cost of about $100,000. This retrofitted plant will now produce up to about 70 tons/hour, i.e., an increase of about 40 percent capacity at a retrofitted cost of only about $5,000/ton capacity.

Another objective of this new pressure reactor technology is the control of ammonia losses by the use of a specially designed elongated inclined reaction tube with variable-area, slotted discharges.

A third objective of the present invention is the elimination or reduction of fossil fuel drying by using higher than normal granulator airflows and the high pressure melt distribution.

This invention, together with further objects and advantages thereof, will be better understood from a consideration of the following description taken in connection with the accompanying drawings in which:

DESCRIPTION OF THE DRAWINGS

Before introducing and discussing FIGS. 1 and 2, the inventors note that they have prepared a graphical illustration of the partial pressures of water and ammonia versus the N:P mole ratio for ammonia, phosphoric acid, water systems at 250° F. The data for the plot was obtained and based on TVA Chemical Engineering Report No. 8, Table 26, page 63, published in 1950 entitled "Phosphorus Properties of the Element and Some of Its Compounds," and plotted at the higher temperature, to wit, 250° F. in accordance with the equation set forth on page 1294 of V. A. Kruglov, 1976, supra. The resulting curve shows when the $NH_3:H_3PO_4$ mole ratio is 1.5 and the slurry temperature is 250° F. (normal operation), the water vapor pressure is about 526 millimeters of mercury, and the ammonia loss from the reactor should be low. However, because of the previously described tank preneutralizer operating experience it was anticipated that the pressure reactor of our invention would perform similar to the preneutralizer and the ammonia losses should be above 20 percent, which is contrary theoretically to partial pressure data (ammonia loss should be low). The unexpected results of lower ammonia loss from the pressure reactor than from the atmospheric reactors shows there is better reaction of the ammonia with the phosphoric acid at elevated pressures. The reactions which occur in the pressure reactor more nearly conform to the theoretical data than do the results from the tank reactor.

FIG. 1 is a flowsheet of conventional prior-art process for the production of granular diammonium phosphate. The feed phosphoric acid to this conventional process from a source not shown is split into lines 1 and 2, which feeds are introduced into ammoniator-granulator scrubber 3 and tank preneutralizer 4. A quantity of water from a source not shown is fed via line 5 to tank preneutralizer 4 and a portion of the ammonia fed to the process via line 6 is also introduced into tank preneutralizer. 4. Water vapor via line 7 is exhausted from tank preneutralizer 4. Partially ammoniated phosphoric acid from ammoniator-granulator scrubber 3 is led via line 8 to tank preneutralizer 4. Scrubber 3 also has water vapor exhausted to the atmosphere via line 9. The contents of tank preneutralizer 4 are fed to rotary ammoniator-granulator 12. Also, the remainder of the ammonia fed to the process via lines 6 and 10 is fed to ammoniator-granulator 12. The high moisture content diammonium phosphate granules are discharged from the ammoniator-granulator 12 via line 13 and fed to dryer 15. Exhaust gases containing ammonia and water vapor from the ammoniator-granulator 12 are transferred via line 14 to scrubber 3. The DAP granules, after leaving dryer 15 via line 16, enter rotary cooler 17. The resulting cooled DAP granules are subsequently conveyed to screens 19 via line 18. Oversized granules removed from screen 19 are crushed in rotating crusher 22 and the resulting crushed material is combined with fines falling through screens 19 via line 24. Combined granules from crusher 22 and screens 19 is recycled back via line 25 to ammoniator-granulator 12. The product size granular diammonium phosphate product is transferred via line 21 from screens 19 out of the granulation to plant to storage, not shown.

FIG. 2 is a drawing of reactor used in the present process. The feed section of the reactor is represented by 31. In section 31, a stream of concentrated phosphoric acid is added via inlet 32 in a direction directly opposed to the stream of dilute acid added via inlet 33. The material introduced into inlet 33 is from scrubber 3 (FIG. 1, supra). By entering the acid streams in this way they are thoroughly mixed before they are contacted with ammonia from the perforated pipe type ammonia sparger shown generally at 34. Holes in this sparger are designed so that there is uniform addition of ammonia throughout the perforated length of the ammonia sparger. Section 31 also has steam inlet 35 for cleaning the pipe during shutdown periods and drain 36 for emptying the pipe during shutdown periods. Reaction section 37 of the reactor is inclined at an angle of between 5 and 20 degrees from the horizontal. Our test results show that there must be a pool of slurry maintained within the reactor; therefore, it must be inclined. Other results of our test indicate that by having a straight tube without turns in reaction section 37, it will usualy remain free of scale. Horizontal tube 38 is used to convey the slurry from reaction section 37 to specially designed slotted discharge 39. Slotted discharge 39 has a large slot which can be covered with plates that have various widths and lengths so that the heat flux at the discharge end of the reactor can be varied which, in turn, can cause pressure within the reactor to be increased to optimum level. Slotted discharge 39 injects slurry into the bed of material 40 in ammoniator-granulator 41. Additional ammonia is added into the bed of material maintained in granulator by ammonia sparger 42. The resulting granulated DAP product is withdrawn from this back end or discharge end of ammoniator-granulator 41 to sizing means, not shown, then to cooling means, not shown, and subsequently to product storage, not shown. Fines and crushed oversize, still at elevated temperatures, is returned to the process by introducing same back to inlet chute 43 shown on the front end or inlet end of ammoniator-granulator 41. This description, of course, refers to a preferred embodiment wherein the DAP plant is built from scratch. In the embodiment wherein an existing plant is retrofitted in accordance with the teachings of the instant invention, the material exiting ammoniator granulator 12, as in FIG. 1, supra, would be introduced into dryer 15, which dryer is operated as a cooler, i.e., without the burner lit. The partially cooled material is subsequently withdrawn from dryer 15 and introduced by means not shown to screens 19. Subsequently only the onsize material from screens 19 would be withdrawn and introduced by means not shown into cooler 17 for effecting further reduction in temperature, and subsequently removed to produce storage. The hot screened undersize and crushed oversize material is introduced via line 25 back into ammoniator-granulator 12.

DESCRIPTION OF THE PREFERRED EMBODIMENTS

The instant improved process relates to preparing granular diammonium phosphate of a particle size distribution emiently suitable for subsequent bulk blending with other fertilizer values. It consists essentially of simultaneously supplying a stream of ammonia to the common pipe section of the pressure reactor; simultaneously supplying a stream of partially ammoniated phosphoric acid, which phosphoric acid may or may not contain sulfuric acid, to the cross section of said pressure reactor, said phosphoric acid having a $P_2O_5$ content of from about 27 to about 31 percent and an N:P mole ratio of from about 0.3 to about 0.8; simultaneously supplying a stream of strong phosphoric acid to the cross section of the pressure reactor, said phosphoric acid containing from about 50 to about 54 percent $P_2O_5$, said streams of said phosphoric acids proportioned to a blend of about 40 percent $P_2O_5$ and contacting said ammonia introduced into said common pipe section of said pressure reactor to said cross section of said pressure reactor, at a temperature of 260° F. to 340° F., at a pressure of 40 to 80 psig; subsequently introducing the reaction product resulting from contacting said ammonia, partially ammoniated phosphoric acid, and strong phosphoric acid into the vapor tube extension of said pressure reactor to insure a continued intimate contact therebetween; subsequently discharging from the downstream end of said vaporization tubular extension a higher temperature ammonium phosphate slurry into the upper end of an inclined rotating drum; therein maintaining a bed of rolling discrete particles of diammonium phosphate; withdrawing diammonium phosphate material from the lower end of said inclined rotating drum; introducing said withdrawn material into sizing means; introducing said material withdrawn from said sizing means into cooling means; withdrawing the resulting cooled material from said cooling means; returning particles of predetermined size from said sizing means into the upper end of said drum and withdrawing from said sizing means granular particles of diammonium phosphate as product; said product characterized by the fact that the combination of relatively high temperatures and pressures utilized therein effects a discharge area heat flux sufficiently high enough to (1) operate said process at a recycle ratio of 3:1, (2) yield a product DAP therefrom containing a moisture content of about 1 to about 2 weight percent, and (3) substantially eliminate from said process the requirement for the addition thereto of external heat energy subsequent to the step of removing said diammonium phosphate from the lower end of said inclined rotating drum.

In the instant process the $NH_3:H_3PO_4$ mole ratio of the reaction product from the pressure reactor is maintained at about 1.4 to 1.5, thereby producing diammonium phosphate at a recycle ratio of about 3 tons of recycle per ton of product.

In the instant process for producing diammonium phosphate, the fossil fuel drying requirements are significantly reduced or eliminated when compared to the conventional tank preneutralizer DAP production process.

The instant process for producing diammonium phosphate utilizes higher discharge heat fluxes than did original pipe-cross reactors. While the cross sectional area heat flux is about 600,000 Btu's per square inch per hour for conventional pipe-cross reactor tank preneutralizer processes, the rectangular slotted discharge of the pressure reactor utilized in the instant invention has a heat flux of 1 to 4 million Btu's per square inch per hour. This extremely high discharge heat flux actually blows unreacted ammonia from the pressure reactor into the bed of moist granules where it is reacted rather than being lost to the atmosphere thereabove.

In order that those skilled in the art may better understand how the present invention can be practiced and more fully and definitely understood, the following examples are given by way of illustration and not necessarily by way of limitation.

EXAMPLE I

In this series of investigations, pilot plant tests were conducted to study the effect of increased pressure and temperature on the operation of a pipe reactor. The results are shown in Table II below.

TABLE II

Study of Pipe Reactor Operation at High Pressure To Produce an Ammonium Phosphate Slurry

| Test number | 1 | 2 |
|---|---|---|
| Pipe reactor | | |
| Diameter, inches[a] | ½ | ½ |
| Length, feet | 8 | 8 |
| Configuration | Horizontal pipe inclined 5° | |
| Melt distributor type | ½ in. turned-down elbow | |
| Feeds to reactor | | |
| Rates, lb/h | | |
| Phosphoric acid[b] | 151 | 151 |
| Gaseous ammonia | 38.5 | 33.5 |
| Water | 49 | 49 |
| Temperature, °F. | | |
| Phosphoric acid | 74 | 75 |
| Gaseous ammonia | 146 | 195 |
| Back pressure, psig | 12 | 75 |
| Phosphoric acid | | |
| Equivalent acid concentration, % $P_2O_5$ | 40.4 | 40.4 |
| Slurry | | |
| Temperature, °F.[c] | | |
| 1 ft | 215 | 275 |
| 2 ft | 250 | 300 |
| 3 ft | 252 | 310 |
| 4 ft | 241 | 300 |
| 5 ft | 246 | 316 |
| 6 ft | 248 | 325 |
| 7 ft | 247 | 330 |
| Chemical analysis, % | | |
| Total N | 13.7 | 13.4 |
| Total $P_2O_5$ | 41.3 | 43.2 |
| $H_2O$ (AOAC) | 19.4 | 16.8 |
| pH (10% solution by weight) | 6.7 | 6.5 |
| $NH_3:H_3PO_4$ mole ratio | 1.68 | 1.57 |
| Ammonia evolution, % of feed | 15.3 | 9.3 |

[a] Nominal pipe size, schedule 40 pipe.
[b] Feed phosphoric acid analysis (wt %) is as follows:

| Test No. | Total $P_2O_5$ | $AL_2O_3$ | $Fe_2O_3$ | F | MgO | $SO_3$ | W.I. solids |
|---|---|---|---|---|---|---|---|
| PRS-8 | 53.5 | 1.5 | 1.4 | 0.94 | 0.88 | 2.9 | 1.6 |

| Test No. | Total $H_2O$ | CaO |
|---|---|---|
| PRS-8 | 18.2 | 0.02 |

[c] Temperatures are pipe skin temperatures measured at the given distances from the pipe reactor tee.

Referring now to Table II, supra, it may be seen that in test No. 1 the reactor was operated at a maximum temperature of about 250° F. and only 12 psig. This test was designed to approximate the operation of a conventional tank-type preneutralizer. In test No. 2, the reactor was operated at a maximum temperature of 330° F. and about 75 psig in order to study the newly discovered method of operation of a pipe reactor. In these two tests, the slurry was caught as it discharged from the pipe and analyzed for moisture. The ammonia loss from each test run was also calculated.

Increasing the pressure from 12 psig in test 1 to 75 psig in test 2 resulted in an average moisture decrease of 13.4 percent in the slurry samples which were analyzed for moisture. This lower slurry moisture will result in lower recycle ratios. Also, in test 2 the feed $NH_3:H_3PO_4$ mole ratio indicates that ammonia losses are slightly less than 10 percent. Most commercial plants have an ammonia loss greater than 20 percent.

In the following Examples II and III, there is illustrated some of the experience we gained in operation of commercial scale DAP plants.

EXAMPLE II

Using the original pressure operation idea and the commercial plant experience gained in our cooperative efforts with a commercial plant, a second large scale commercial plant operator was persuaded to install the second generation design pressure DAP reactor. FIG. 2, supra, shows the design details of this pressure reactor. The reactor has an overall length of about 45 feet with over 30 feet of inclined reaction tube section. The 10-inch-diameter pipe reactor was operated for 8 hours at a production rate of 40 tons per hour. In this test work, a slot 36 inches long by 1½ inches wide was used. The pressure on the pipe-cross reactor only averaged about 20 psig. At this pressure the ammonia loss from the pipe-cross reactor was unacceptable (about 25 percent). This commercial plant's scrubber system was unable to handle this large amount of ammonia. The sump tank on the scrubber loop had to be damped of ammoniated phosphoric scrubbing acid on several occasions. This dumped acid had an N:P mole ratio of about 1. The mole ratio in the pipe reactor varied from 1.3 to 1.5 in this test. However, the operations were more consistent at the 20 psig pressure than at pressures close to atmospheric pressure. This example, taken in conjunction with the teachings in Example III, infra, illustrates the critical feature of the instant invention, to wit, the pressure operating parameter.

EXAMPLE III

The same equipment arrangement was used in this example as was used in Example II except the design of the discharge slot was charged to increase the exit velocity of melt from the reactor. This also increased the back pressure developed at the feed end of the reactor. In the test of this example, a ½-inch wide by 30-inch long rectangular slot was used to obtain a high melt exit velocity and an operating pressure of 40 psig. The location of the melt discharge from this slot was precisely positioned between two ammonia sparger supports and angled onto the bed so that the melt penetrates the thickest part of the bed.

Details of this commercial DAP plant in which this pressure reactor was operated are as follows: The TVA type ammoniator-granulator is 10 feet in diameter by 20 feet long. This plant normally has a DAP production capacity of 50 tons per hour with the lowest achievable recycle being about 5 tons of recycle per ton of product. This operation is carried out with a conventional TVA type tank preneutralizer. The on-grade DAP product normally has a moisture content of about 1 percent and is produced with about 150,000 Btu's per ton of fossil fuel drying. The ammonia loss from the tank preneutralizer and rotary ammoniator-granulator is scrubbed back into the process by a venturi scrubber. Operating details of this test are shown in Table III below.

TABLE III

Production of Granular Diammonium Phosphate Sulfate
TVA Pressure-Type Reactor 10-Inch Diameter × 41 Feet Long
Commercial Plant Test - June 1983

| | |
|---|---|
| Production rate, tons/hr | 58 |
| Recycle ratio, tons recycle/ton product | 3.7 |
| Pressure reactor operating conditions | |
| Pressure, psig | 40 |
| Temperature (estimated), °F. | 290 |
| Mole ratio, N:P | 1.4 |
| Feeds | 175 |
| Scrubber acid (39.5% $P_2O_5$, 0.38 MR, 1.55 sp. gr.), gpm | |
| Gaseous ammonia, lb/hr., 80° F. | 16,940 |
| Ammoniator-Granulator | |
| Ammonia fed lb/hr., 80° F. | 8,430 |
| Granular fertilizer discharge temperature, °F. | 220 |
| Ammonia loss, % of ammonia fed to pressure-type reactor and granulator | 19.0 |
| Heat fluxes, $10^6$ Btu/in$^2$-hr | |
| X-sectional area (10-inch diameter) | 0.5478 |
| Slotted discharge (½" × 30") | 2.866 |
| Ammonia loading lb $NH_3$/in$^3$-hr (based on inclined 30-ft. reactor section) | 0.463 |
| Product analysis, % | |
| N | 18.05 |
| $P_2O_5$ | 46.03 |
| $H_2O$ | 0.95 |

Referring now to Table III, supra, it may be seen that in this particular pressure reactor DAP production test, a production rate of 58 tons per hour was obtained. This resulted in a recycle ratio of 3.7 tons of recycle per ton of product. The pressure reactor operated at a mole ratio of 1.4 N:P with a pressure of 38 psig and an estimated temperature of 290° F. During this test the reactor was fed scrubber acid which contained 39.5 percent $P_2O_5$ ammoniated to an N:P mole ratio of 0.38. The scrubber acid was fed at a rate of 175 gallons per minute. The gaseous ammonia at 80° F. was fed at 16,940 pounds per hour. In the bed of the ammoniator-granulator additional 80° F. gaseous ammonia was fed at a rate of 8430 pounds per hour. The cross sectional area heat flux of the reactor was 547,800 Btu's per square inch per hour. The slotted discharge, ½-inch by 30 inches, had a heat flux of 2,866,000 Btu's per square inch per hour. The ammonia loading on the reactor was 0.463 pounds of ammonia per cubic inch per hour. The ammonia loss from the pressure-type reactor and the granulator totaled about 19 percent of the ammonia fed to the process during this run. This is an acceptable ammonia loss for a commercially operating DAP plant, particularly when it is considered that the plant was operated at almost 20 percent over its rated capacity. The product analysis was 18.05 percent N, 46.03 percent $P_2O_5$, and 0.95 percent $H_2O$. During this test the granule size distribution of the discharge from the granulator which had an average temperature of about 220° F. was excellent. The cagemills in this DAP plant were only operated with the inner cages. There was so little oversize that the outer cages were not operated during this test. Chutes remained clear due to the low moisture content of the material passing through the plant. There were no plugging problems during this test. The reasons that this test had to be terminated and only run at 58 tons per hour were a loss of steam from the sulfuric acid plant and inadequate ammonia pumping capacity of the liquid ammonia to the vaporizer receiving this steam. When a larger ammonia pump has been installed in this plant, tests will be conducted at 70 to 75 tons per hour.

INVENTION PARAMETERS

Commercial plant test work with this new pressure-type reactor for DAP production has led to the development of the design and operating criteria shown in Table IV below.

TABLE IV
Design and Operating Criteria
TVA Pressure-Type Reactor, DAP Production

| Item | Preferred Criteria | Range of Criteria |
|---|---|---|
| Ammonia loading, lb $NH_3/in^3$-hr | 0.5 | 0.4–0.7 |
| X-Sectional area heat flux, $10^6$ Btu/$in^2$-hr (inclined reactor tube) | 0.6 | 0.5–0.8 |
| Discharge area heat flux, $10^6$ Btu/$in^2$-hr (discharge slot) | 3.0 | 1.0–4.0 |
| Temperature, °F. | 310 | 260–310 |
| Pressure, psig | 60 | 40–80 |
| N:P mole ratio | 1.4 | 1.4–1.6 |
| Angle of inclined reaction section, degrees | 20 | 5–20 |

Referring now to Table IV, supra, it may be seen that significantly longer reactor tubes than initially shown in the work of Achorn and Lewis have been needed to get ammonia loadings in the range of 0.4 to 0.7 pounds of ammonia per cubic inch per hour. Longer residence times in the reactor are needed to obtain the higher N:P mole ratios of 1.4 to 1.5. A preferred ammonia loading would be 0.5. The heat flux calculations on the pipe reactor operation are now made at two specific points. The cross sectional area heat flux for this process should be in the range of 0.5 to $0.8 \times 10^6$ Btu's per square inch per hour. The heat flux on the rectangular discharge area of the pipe should be in the range of 1.0 to $4.0 \times 10^6$ Btu's per square inch per hour. The preferred heat fluxes have been found to be 0.6 on the cross sectional area and 3.0 on the discharge area. This pressure-type reactor is operated at significantly higher temperature and pressure than previous pipecross reactor processes. The normal temperature range is 260° F. to 330° F. with 310° F. being the preferred temperature. The pressure range is 40 to 80 psig with a pressure of 60 being preferred. At this pressure, the ammonia lost from the pressure-type reactor is injected into the bed of material in the granulator where it is absorbed by the free acid of the granule in this bed.

While we have shown and described particular embodiments of our invention, modifications and variations thereof will occur to those skilled in the art. We wish it to be understood, therefore, that the appended claims are intended to cover such modifications and variations which are within the true scope and spirit of our invention.

What we claim as new and desire to secure by Letters Patent of the United States is:

1. An improved process for preparing granular substantially dust free, diammonium phosphate of particle size distribution eminently suitable for bulk blending with other fertilizer values, which improved process comprises supplying a stream of ammonia to the reaction section of a pressure pipe reactor; simultaneously supplying a stream of partially ammoniated phosphoric acid to said reaction section of said pressure pipe reactor, said partially ammoniated phosphoric acid having a $P_2O_5$ content ranging from about 27 to about 31 percent by weight and a N:P mole ratio ranging from about 0.3 to about 0.8; simultaneously supplying a stream of wet-process merchant-grade phosphoric acid to said feed section of said pressure pipe reactor, said merchant-grade phosphoric acid containing from about 50 to about 54 percent $P_2O_5$ by weight, said streams of said partially ammoniated phosphoric acid and said merchant-grade phosphoric acid proportioned one to another to effect a blend thereof ranging from about 38 to about 42 percent $P_2O_5$ by weight, and contacting said ammonia introduced into said feed section of said pressure pipe reactor with said streams of phosphoric acid; maintaining in said pressure pipe reactor a temperature ranging from about 260° F. to about 340° F. and a pressure ranging from about 40 psig to about 80 psig; subsequently introducing the partial reaction product resulting from contacting said ammonia with said partially ammoniated phosphoric acid and said merchant-grade phosphoric acid into the vapor tube extension of said pressure type reactor to ensure continuous intimate contact therebetween; subsequently discharging from the downstream portion of said vapor tube extension through a discharge area comprising an exaggerated elongated aperture in the side wall thereof an amorphous diammonium phosphate material into the upper end of an inclined rotating drum and on to a bed of rolling discrete particles of diammonium phosphate maintained therein; subsequently withdrawing particulate diammonium phosphate material from the lower end of said inclined rotating drum and introducing same into sizing means; withdrawing from said sizing means granular particles within a predetermined size range and introducing same into cooling means; withdrawing from said cooling means as product the resulting cooled particles of diammonium phosphate of a preselected size range; withdrawing from said sizing means fines and crushed oversize particles of diammonium phosphate and returning same as recycle into the upper end of said inclined rotating drum, said improved process characterized by the fact that the combination of relatively high temperatures and pressures utilized therein effects a discharge area heat flux sufficient to (1) operate said process at a recycle ratio of 3:1, (2) yield a product DAP therefrom containing a moisture content of about 1 to about 2 weight percent, and (3) substantially eliminate from said process the requirement for the addition thereto of external heat energy subsequent to the step of removing said diammonium phosphate from the lower end of said inclined rotating drum.

2. The process of claim 1 wherein the length:width of said discharge area ranges from about 80 to about 20.

3. The process of claim 1 wherein said discharge area heat flux ranges from about $1 \times 10^6$ Btu's /$in^2$-hr to about $4 \times 10^6$ Btu's/$in^2$-hr.

4. The process of claim 3 wherein said discharge area heat flux is maintained at about $3 \times 10^6$ Btu's/$in^2$-hr.

5. The process of claim 3 wherein the temperature maintained in said pressure pipe reactor is about 310° F.

6. The process of claim 3 wherein the pressure in said pressure pipe reactor is maintained at about 60 psig.

7. The process of claim 1 wherein the ammonia loading in said pressure pipe reactor ranges from about 0.4 to about 0.7 pounds of ammonia/$in^2$-hr to thereby effect a N:P mole ratio in the material discharge area in the range from about 1.4 to about 1.6.

* * * * *